Jan. 16, 1923. 1,442,502
H. H. WADDELL.
RESERVE OIL TANK FOR AUTOMOBILES.
FILED APR. 6, 1921.
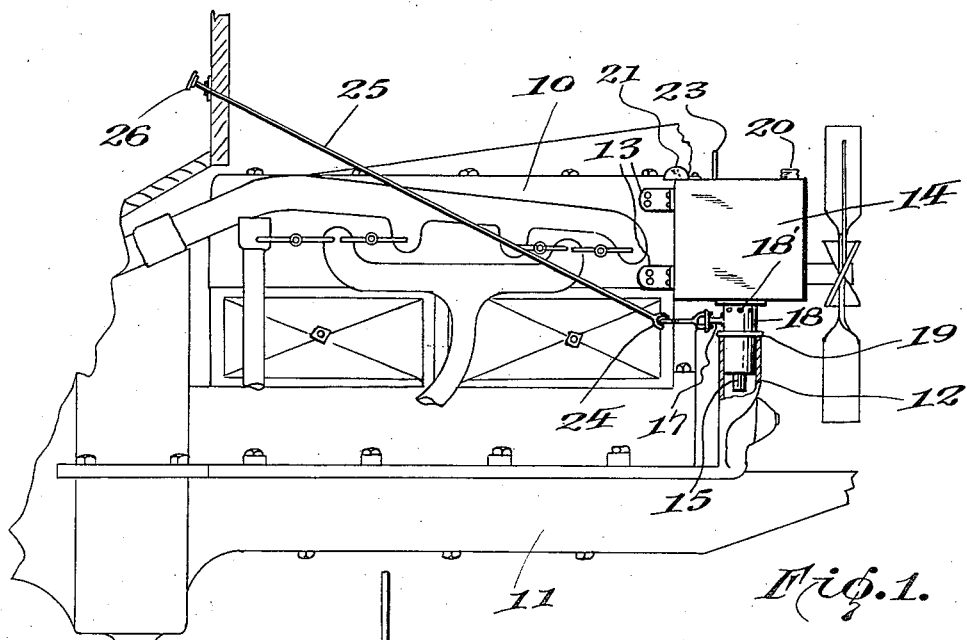
Fig. 1.
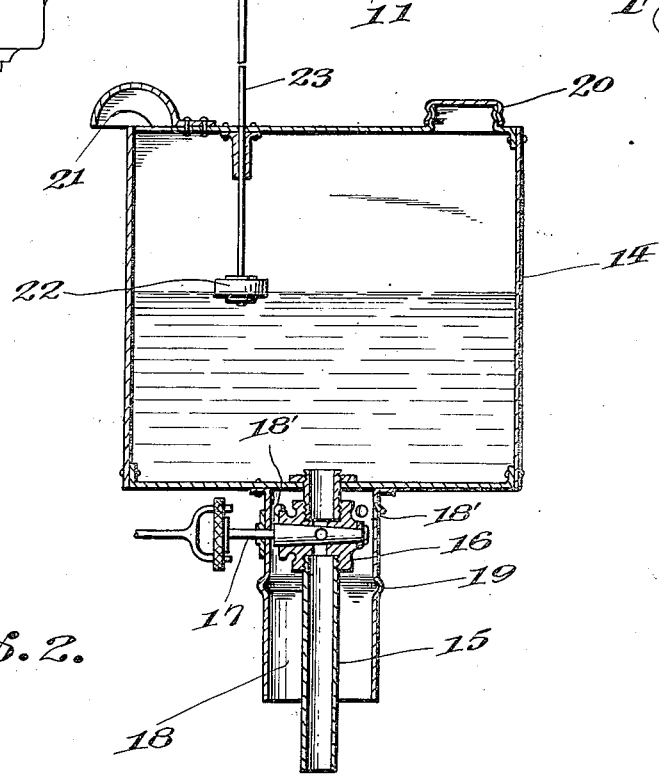
Fig. 2.
Inventor:
Harvey H. Waddell.
By 
Attorneys.

Patented Jan. 16, 1923.

1,442,502

UNITED STATES PATENT OFFICE.

HARVEY H. WADDELL, OF CARY, NORTH CAROLINA.

RESERVE OIL TANK FOR AUTOMOBILES.

Application filed April 6, 1921. Serial No. 459,024.

*To all whom it may concern:*

Be it known that I, HARVEY H. WADDELL, a citizen of the United States, residing at Cary, in the county of Wake, State of North Carolina, have invented certain new and useful Improvements in Reserve Oil Tanks for Automobiles; and I do hereby declare the following to be a full, clear and exact description of the invention, such as will enable others skilled in the art to which it appertains, to make and use the same.

This invention relates to reservoirs for supplies of oils for automobiles and particularly to reservoirs for supplies of lubricating oils.

One object of the invention is to provide a means for carrying a reserve supply of lubricating oil which can be easily and quickly emptied into the crank case of the engine, by the driver, from his seat.

Another object is to provide a device of this character which serves as a closure for the breather pipe of the crank case, while at the same time serving as a means through which the crank case can be filled with oil in the ordinary way.

Another object is to provide a device of this character which will not interfere with the ordinary function of the breather.

Other objects and advantages will be apparent from the following description when taken in connection with the accompanying drawing.

In the drawing:

Figure 1 is a side elevation of the invention applied to an automobile engine, the crank case and breather being shown in section.

Figure 2 is a similar sectional view, but showing the tank partly broken away to expose the float, and the discharge pipe and valve being in section.

Referring particularly to the accompanying drawing, 10 represents a portion of an automobile engine which has the crank case 11 provided with the breather pipe 12, with the latter of which the invention is associated.

Carried by the front portion of the engine body are the strap brackets 13 which support the reserve supply tank of lubricating oil. In the bottom of this tank 14 is a discharge pipe 15 which extends down into the breather pipe 12 and has therein the turn-plug valve 16, provided with a stem 17 which extends through the side of the pipe 12. Also secured to the bottom of the tank 14, and enclosing the pipe 15, is a pipe 18, or larger diameter than the pipe 15, this pipe 18 extending downwardly in snug fitting position within the breather pipe 12. The pipe 18 is formed with an external bead 19 which rests on the upper end of the pipe 12, to aid in supporting the tank. The upper wall of the tank is provided with a filling opening and closure 20, and an air vent 21. Also disposed within the tank is a float 22, the stem 23 of which extends upwardly through the top wall of the tank to show the depth of the oil within the tank.

Connected to the valve stem 17, by means of the universal joint 24, is the operating rod 25, which extends rearwardly through the dashboard or instrument board of the automobile, where it is provided with a handle 26 for manipulation by the driver, so that he can open the valve to permit the oil from the tank to run down into the crank case, when the supply in the crank case has run low.

In the upper portion of the pipe 18, below the bottom of the tank, and above the upper end of the breather pipe, are formed the circular series of openings 18', which serve as vents for the breather.

By reason of the fact that the pipe 15 is of considerably smaller diameter than the pipe or tube 18, there is provided a large space within the tube or pipe 18, and surrounding the pipe 15, for the passage of air to and from the crank-case. The fact that the pipe 15 extends downwardly beyond the lower end of the pipe 18, greatly enhances the breathing function, and permits oil to be discharged from the tank, into the crank-case, while the car is moving at any speed.

What is claimed is:

An attachment for an automobile engine comprising a reserve oil supply tank mounted on the engine, a tube on the bottom of the tank snugly fitting within the breather pipe of the crank-case and having air vents in its upper end, and an oil discharge pipe connected to the bottom of the tank and extending longitudinally and centrally within the tube and being of smaller diameter than the tube to provide a large air space between the pipe and tube for the breathing function of the breather pipe, said pipe extending beyond the lower end of the tube.

In testimony whereof, I affix my signature, in the presence of two witnesses.

HARVEY H. WADDELL.

Witnesses:
J. BRANTLEY,
J. W. TEMPLETON, Jr.